United States Patent
Delfyett

(10) Patent No.: US 7,460,242 B2
(45) Date of Patent: Dec. 2, 2008

(54) SYSTEMS AND METHODS FOR HIGH-PRECISION LENGTH MEASUREMENT

(75) Inventor: Peter J. Delfyett, Orlando, FL (US)

(73) Assignee: University of Central Florida Research Foundation, Inc.

(*) Notice: Subject to any disclaimer, the term of this patent is extended or adjusted under 35 U.S.C. 154(b) by 89 days.

(21) Appl. No.: 11/512,966

(22) Filed: Aug. 30, 2006

(65) Prior Publication Data

US 2008/0273209 A1  Nov. 6, 2008

(51) Int. Cl.
*G01B 11/02* (2006.01)
*G01C 3/08* (2006.01)
(52) U.S. Cl. .................. 356/498; 356/4.09
(58) Field of Classification Search .......... 356/4.09, 356/5.01, 496, 497, 498
See application file for complete search history.

(56) References Cited

U.S. PATENT DOCUMENTS 6,252,655 B1* 6/2001 Tanaka ............... 356/5.06
7,023,556 B2* 4/2006 Dorrer ................ 356/477

* cited by examiner

*Primary Examiner*—Michael A Lyons
(74) *Attorney, Agent, or Firm*—Thomas, Kayden, Horstemeyer & Risley, LLP

(57) ABSTRACT

Provided are systems and methods for performing high-precision length measurement. One such system includes: an optical receiver, configure to receive a reflected optical pulse from a target; an optical combiner, configured to generate a combined optical pulse using the reflected optical pulse and a reference optical pulse; and a signal analyzer configured to determine a distance to the target using a depth of modulation value of the combined signal. A method as disclosed herein includes the steps of determining a first length component of a combined optical signal using a depth of modulation value and determining a second length component of the combined optical signal using a modulation period value.

15 Claims, 6 Drawing Sheets

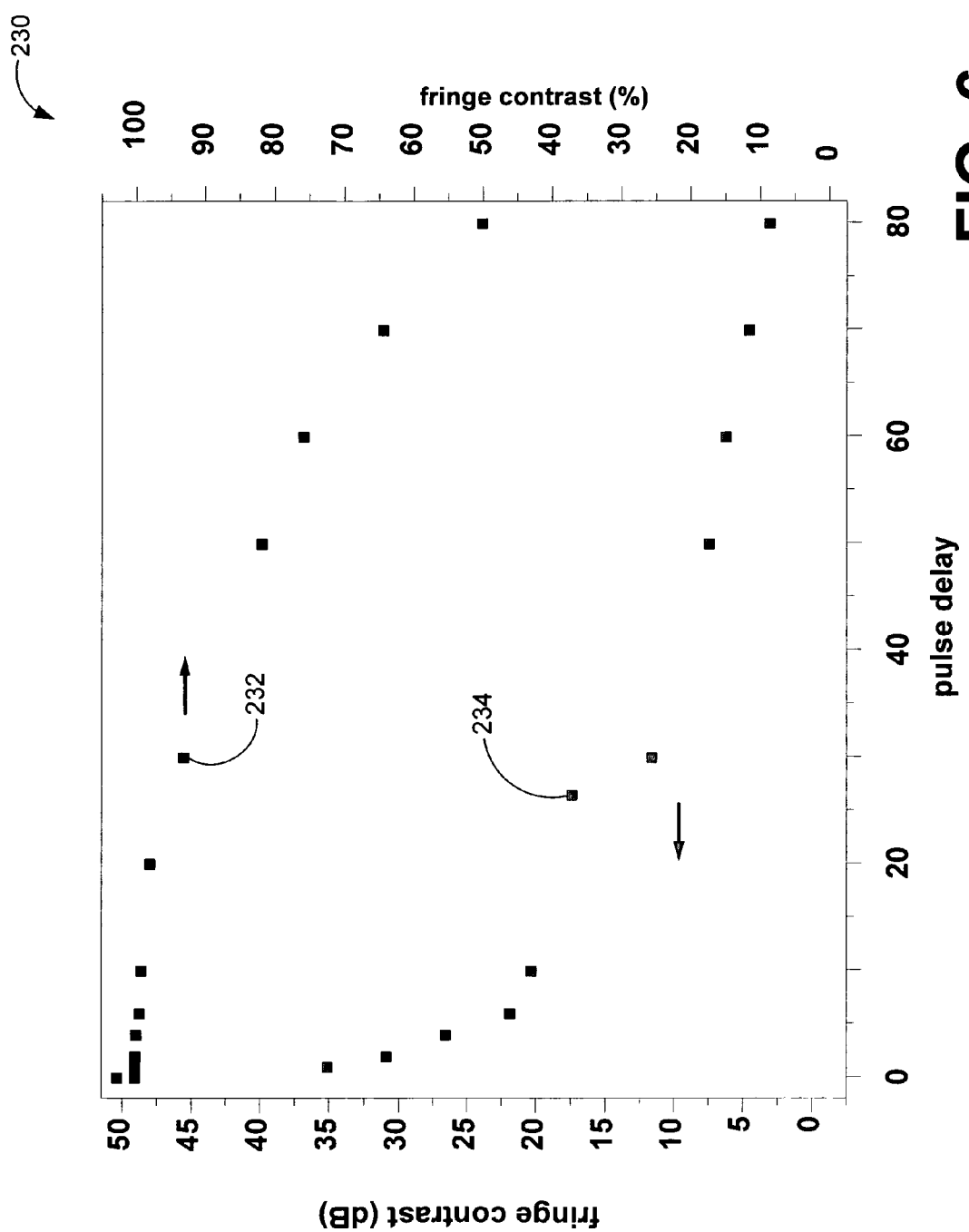

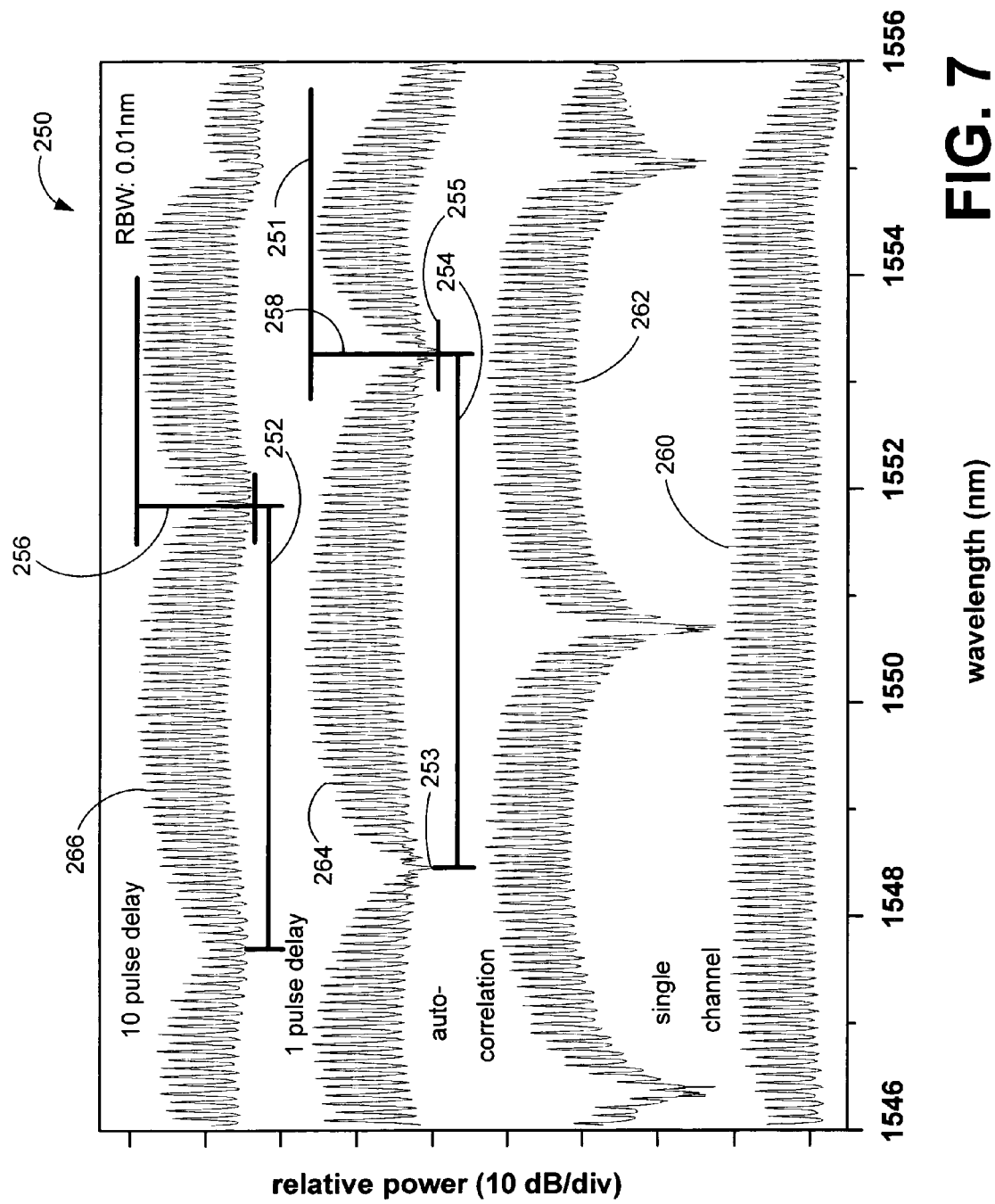

SYSTEMS AND METHODS FOR HIGH-PRECISION LENGTH MEASUREMENT

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms under Contract No. MDA97203C0043 awarded by DARPA of the U.S. Government.

TECHNICAL FIELD

The present disclosure is generally related to optical range detection and, more particularly, is related to systems and methods for high-precision length measurement.

BACKGROUND

Length measurement using optical signals can be performed using two general methodologies. The first approach uses the incoherent detection of light pulses to determine time-of-flight information, which is then converted to distance. While this approach is suitable for long distance measurements, high-precision measurements are generally unavailable due to hardware performance limitations. The second methodology uses detection of optical coherence, also referred to as interference fringes, to perform length or distance measurements with high precision. This technique is suitable for the precise measurement of incremental or relative displacements. However, it is not suitable for measurement over large distances where an absolute measurement is required. In an effort to overcome the aforementioned limitations, methods have been developed that use a separate fast detector to determine time of flight and an optical spectral analyzer to perform fringe-resolved cross-correlation to increase the measurement precision. These methods, however, are complex and require significant hardware resources. Thus, a need exists in the industry to address the aforementioned deficiencies and inadequacies.

SUMMARY

Embodiments of the present disclosure provide a system and method for providing high-precision length measurement. In one embodiment a method includes: generating a plurality of optical pulses; splitting each of the plurality of optical pulses into a plurality of reference pulses and a plurality of transmit pulses; transmitting the plurality of transmit pulses towards a target; receiving a plurality of reflected pulses from the target; combining one of the plurality of reflected pulses and one of the plurality of reference pulses into a combined pulse; determining a first length component using a depth of modulation value of the combined pulse; and determining a second length component using a modulation period of the combined pulse.

In another embodiment, a method includes determining a first length component of a combined optical signal using a depth of modulation value and determining a second length component of the combined optical signal using a modulation period value.

In a further embodiment, a system includes: an optical receiver, configured to receive a reflected optical pulse from a target; an optical combiner, configured to generate a combined optical pulse using the reflected optical pulse and a reference optical pulse; and a signal analyzer configured to determine a distance to the target using a depth of modulation value of the combined signal.

Other systems and methods will be or become apparent from the following drawings and detailed description.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

FIG. 6 is a graph illustrating an embodiment of a plot of fringe contrast versus pulse delay of pulses generated by a mode-locked laser source.

FIG. 7 is a graph illustrating an embodiment of spectral interferograms plotting relative power versus wavelength of multiple optical signals.

DETAILED DESCRIPTION

Reference will now be made to the drawings. While the disclosure will be provided in connection with these drawings, there is no intent to limit the disclosure to the embodiment or embodiments disclosed herein. On the contrary, the intent is to cover all alternatives, modifications, and equivalents.

Figure 1:
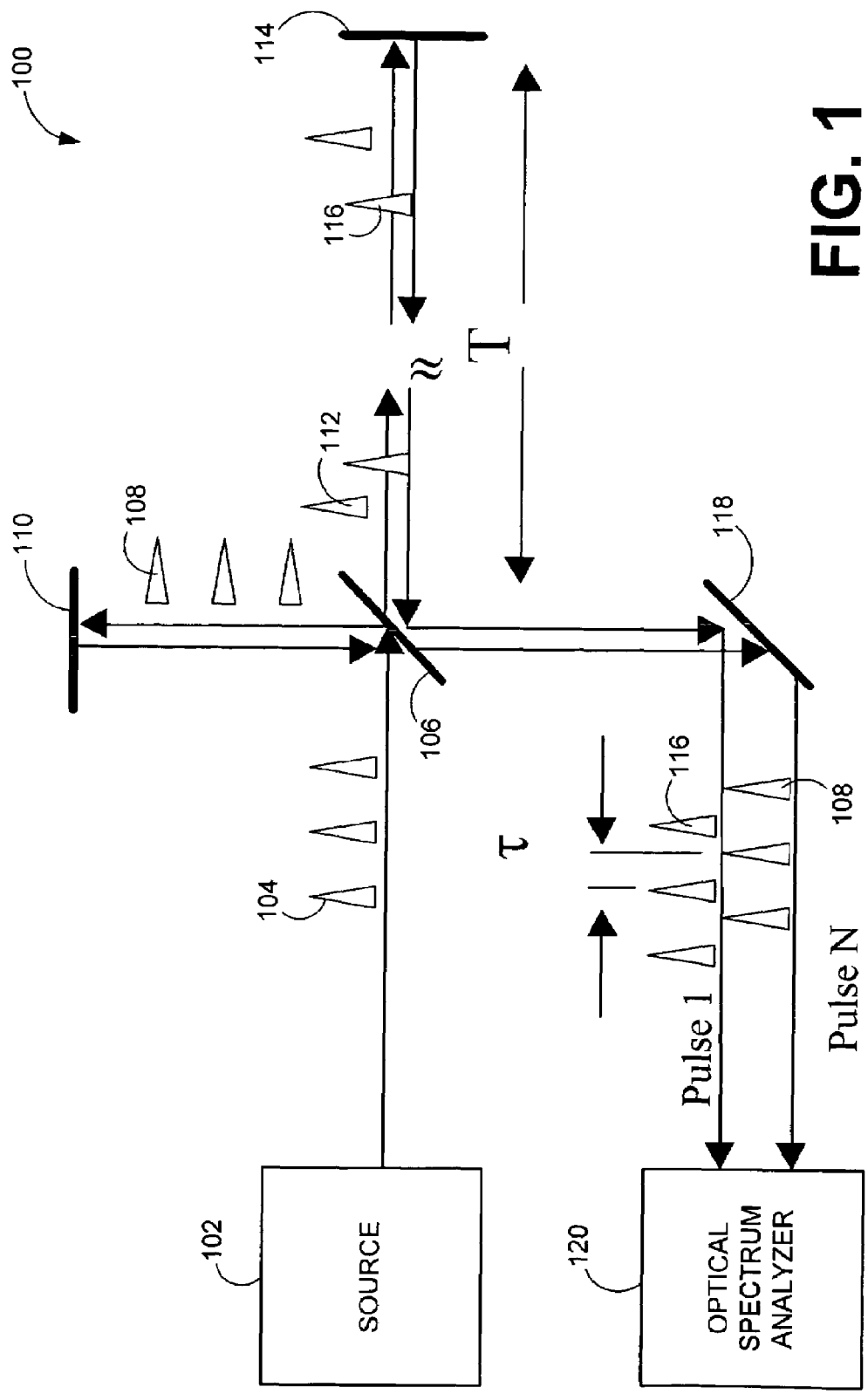
FIG. 1 is a schematic view illustrating an embodiment of a system for performing high-precision length measurement.

Reference is first made to FIG. 1, which is a schematic view illustrating an embodiment of a system 100 for performing high-precision measurement. The system 100 includes a source 102 that is configured to generate optical signals. The source 102 can be, for example, a laser configured to generate laser pulses 104. In some embodiments, the laser is a mode-locked laser, which can generate laser pulses having a very narrow pulse width with a very large spectral bandwidth at a relatively uniform spacing of lasing modes in the frequency domain. The laser pulses 104 are received by a beam splitter 106, which splits each pulse into two substantially identical pulses. The split pulses are reference pulses 108 and transmit pulses 112. The reference pulses 108 are directed towards a reference reflector 110 that is positioned at a known distance from the beam splitter 106.

The transmit pulses 112 are directed to a target 114, which reflects a portion of the transmit pulses 112 back to, for example, a reflective surface on the beam splitter 106 in the form of reflected pulses 116. The reflected pulses 116 are transmitted to a combiner 118. Additionally, the reference reflector 110 reflects the reference pulses 108 to the combiner 118 that is also configured to receive the reference pulses 108. A combined optical signal of both the reflected pulses 116 and the reference pulses 108 is received by an optical spectrum analyzer 120.

In the case of a mode-locked laser, one component of the distance to the target 114 can be calculated by determining the combined time of flight, T, of the transmit pulses 112 and reflected pulses 116. The time of flight, T, can be determined, for example, by counting the number of pulses that have been transmitted during the combined travel time of the transmit pulses 112 and the reflected pulses 116. This component of the distance to the target, however, is limited in resolution to that of the distance between each pulse as determined by the frequency of the mode-locked laser. For example, the where the frequency of a mode-locked laser is such that the pulses are one foot apart, this component of the distance can be resolved to the nearest foot. Determining which of a string of reflected pulses 116 and reference pulses 108 are being compared to determine the time of flight, T, can be performed by determining the depth of modulation of the combined optical signal. The depth of modulation can be determined by the optical spectrum analyzer 120, which receives the combined optical signal.

The depth of modulation can be ascertained by determining the maximum difference in spectral intensity between a peak and an adjacent valley on a plot of the spectral intensity versus the optical frequency. Alternatively, the depth of modulation can be determined by the difference between the lowest and highest relative power values as plotted against wavelength of the combined optical signal.

Another component of the distance to the target 114 can be calculated by determining fractional delay, $\tau$, between a reflected pulse 116 and a reference pulse 108. The fractional delay, $\tau$, can be calculated by determining the modulation period of the combined optical signal. The modulation period can be determined by the optical spectrum analyzer 120 as the difference in frequency between two adjacent local maxima of spectral intensity plotted as a function of optical frequency. Alternatively, the modulation period can be determined as the difference in wavelength between adjacent local minima of relative power as a function of wavelength. By determining the fractional delay, $\tau$, and the time of flight, T, as calculated by the number of pulses multiplied by the period of the pulse string, the combined optical signal can be used to calculate the distance to the target at a high resolution.

Figure 2:
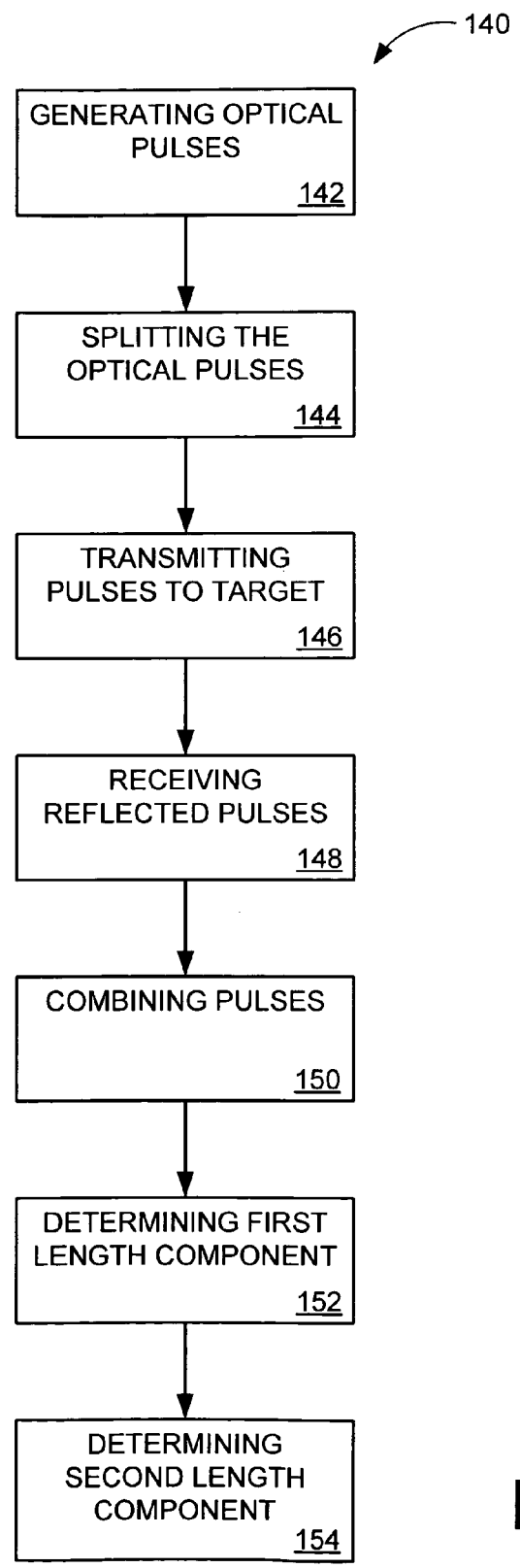
FIG. 2 is a block diagram illustrating an embodiment of a method for performing high-precision length measurement.

Reference is now made to FIG. 2, which is a block diagram illustrating an embodiment of a method 140 for performing high-precision length measurement. The method begins with generating optical pulses in block 142. The optical pulses can be generated using, for example, a laser including, but not limited to, a mode-locked laser. The optical pulses are split in block 144 to create two substantially identical optical pulse streams. One of the pulse streams can be configured as reference pulses that are transmitted to a reference arm. The other pulse stream can be configured as transmit pulses and transmitted to a target in block 146. At least some portion of the transmit pulses is reflected from the target and the reflected pulses are received in block 148. The reflected pulses are combined with the reference pulses to create combined pulses in block 150.

A first length component is determined in block 152 by analyzing the combined pulses. The analysis can be performed using, for example, an optical spectrum analyzer. The first length component can be determined using the depth of modulation of the combined pulses. The depth of modulation changes because each successive pulse in the pulse stream is increasingly dissimilar than previously generated pulses. The dissimilarity between subsequent pulses is a function of a laser property referred to as coherence length. The later that a pulse occurs in a pulse stream, the greater the contrast relative to a previously transmitted pulse. By using the contrast to determine the number of pulses that have been generated between the reflected pulse and the reference pulse, a distance component having a maximum resolution equal to the distance between two adjacent pulses, also referred to as the pulse distance, can be determined.

A second length component is determined in block 154 by analyzing the combined pulses using the optical spectrum analyzer. The optical spectrum analyzer can use, for example, a modulation period to determine the second length component. The second length component is the fractional portion of the pulse distance as determined by the portion of the overlap between the reflected and reference pulses. In this manner, the modulation period provides the small separation between pulses and the depth of modulation provides the number of pulses over a large distance. The sum of the first length component and the second length component is the distance to the target as determined with a high level of precision.

Figure 3:
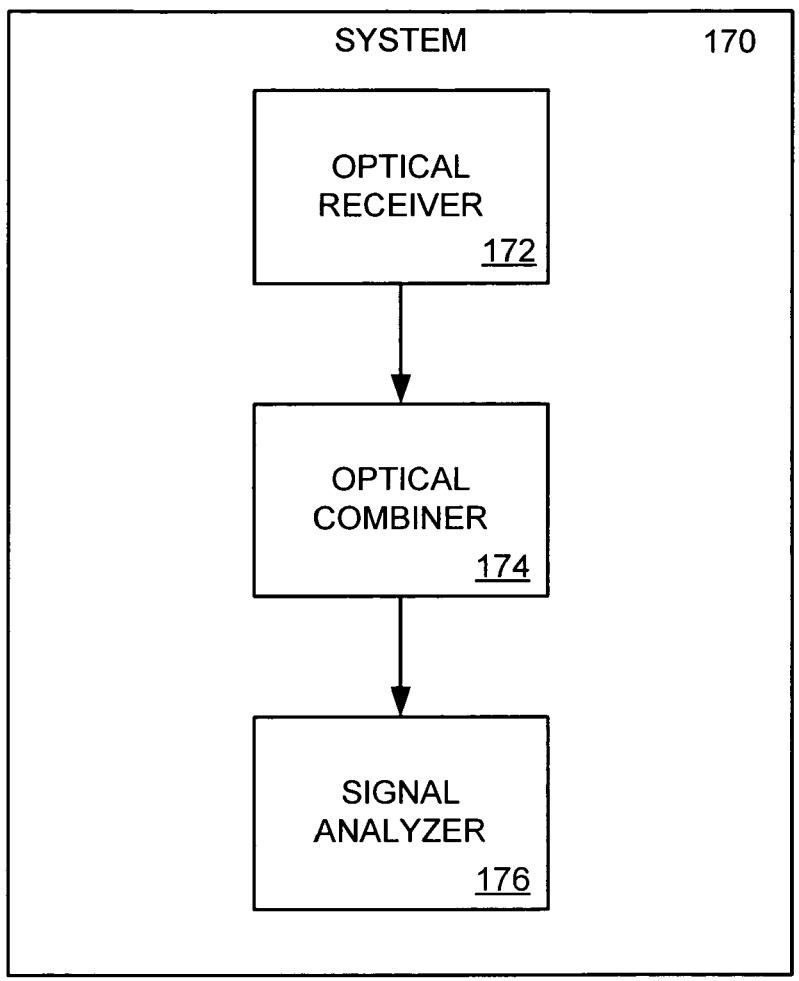
FIG. 3 is a block diagram illustrating an alternative embodiment of a system for performing high-precision length measurement.

Reference is now made to FIG. 3, which is a block diagram illustrating an alternative embodiment of a system 170 for performing high-precision length measurement. The system 170 includes an optical receiver 172 configured to receive reflected optical signals from a target. The reflected optical signals are combined with reference optical signals in an optical combiner 174. In some embodiments the reference optical signals are generated from the same optical source as the reflected optical signals. The system 170 also includes a signal analyzer 176 configured to determine the distance to the target based on the content of the combined optical signal. Properties of the combined optical signal that can be utilized to determine the distance include, but are not limited to, depth of modulation and modulation period. The depth of modulation can be used to determine a large distance value having a resolution value of one pulse distance, which is the distance between two adjacent pulses in a pulse stream. The modulation period can be used to determine a small distance value, which is a fractional value of the pulse distance. In this manner, the sum of the large distance value and the small distance value represents a high-precision value of the distance to the target over a large distance.

Figure 4:
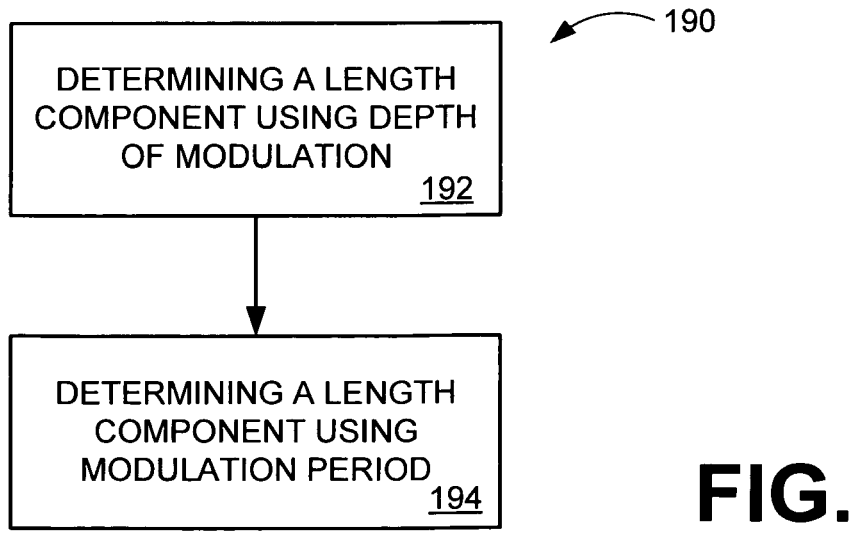
FIG. 4 is a block diagram illustrating an alternative embodiment of a method for performing high-precision length measurement.

Reference is made to FIG. 4, which is a block diagram illustrating an alternative embodiment of a method 190 for performing high-precision length measurement. The method includes determining a length component using a depth of modulation value in block 192. The depth of modulation value reflects the dissimilarity between the pulses in a reflected optical signal and a reference optical signal. The depth of modulation varies with each successive pulse in a pulse stream based on the dissimilarity between later pulses and earlier pulses in the same pulse stream. The later that a pulse occurs in a pulse stream, the greater the contrast relative to a previously transmitted pulse. By using the contrast to determine the number of pulses that have been generated between the reflected pulse and the reference pulse, a distance component having a resolution within the distance between two adjacent pulses, also referred to as the pulse distance, can be determined.

Additionally, the method 190 includes determining a length component using the modulation period of the combined optical signal in block 194. The modulation period of the combined optical signal varies based on the portion of overlap between the reference pulse and the reflected pulse. By determining the portion of the overlap, a small, highly precise length value representing a fraction of the distance between two adjacent pulses can be determined. The sum of the two length components provides a high-precision total length value that can be determined aver a large range. In some embodiments, the measurement can be taken over ranges including, for example, three kilometers and provide a resolution in, for example, 30 microns range.

Figure 5:
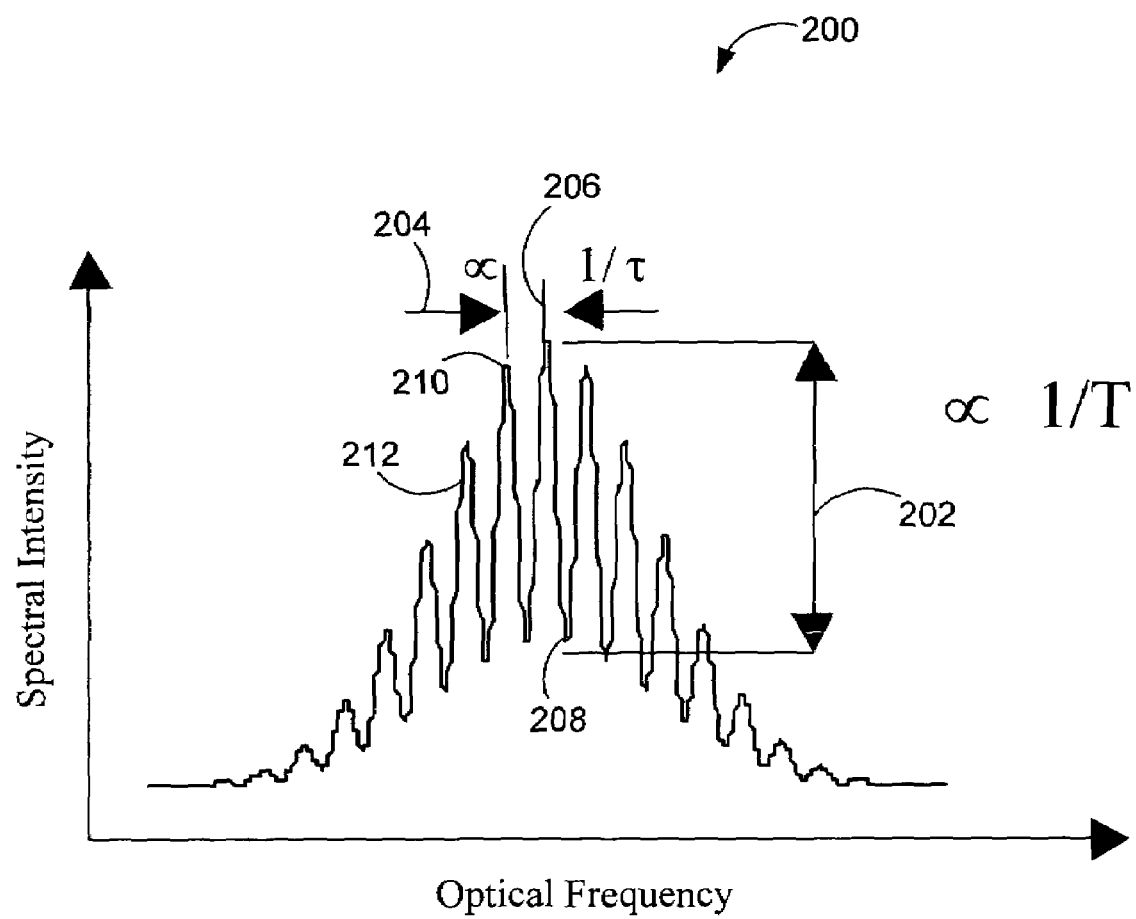
FIG. 5 is a graph illustrating an embodiment of a plot of spectral intensity versus optical frequency of a combined optical signal.

Reference is now made to FIG. 5, which is a graph 200 illustrating an embodiment of a plot 212 of spectral intensity versus optical frequency of a combined optical signal. As illustrated by the plot 212, the depth of modulation 202 is the maximum peak-to-peak measurement of the spectral intensity of a combined optical signal. The depth of modulation 202 is determined by measuring the difference in spectral intensity between a first peak 206 and an adjacent valley 208. By determining the depth of modulation, which is a measure of the contrast between a reference pulse and a reflected pulse, the number of pulses and the corresponding distance in pulse lengths can be determined. In this manner, the length to a target can be determined to a resolution of one pulse distance, which is the distance between serially transmitted pulses.

The modulation period 204 can be determined by taking the reciprocal of the difference in optical frequency between the first peak 206 and the second peak 210. The modulation period 204 can be used to determine the value of any fractional overlap between a reference pulse and a reflected pulse. By summing the distance in pulse lengths and the fractional overlap, the total distance can be measured with a high degree of precision over a large distance.

Reference is now made to FIG. 6, which is a graph 230 illustrating an embodiment of a plot of fringe contrast versus pulse delay of pulses generated by a mode-locked laser source. The fringe contrast is a result of the coherence length property of a laser. The graph 230 includes the fringe contrast percentage 232 as a function of pulse delay. As the pulse delay increases, the fringe contrast percentage 232 decreases at a varying rate based on the level of the delay. Where the delay is relatively small, such as, for example, less than 20 units, the fringe contrast percentage 232 decreases on the order of one to two percent. As the pulse delay increases from 20 to 40 units, the fringe contrast percentage decreases to approximately 90 percent. As the pulse delay further increases from 40 to 60 units, the fringe contrast percentage 232 decreases to approximately 75 percent. The fringe contrast percentage 232 further decreases to approximately 50 percent as the pulse delay approaches 80 units, wherein there are approximately 100 picoseconds per pulse delay.

The graph 230 also includes a plot of the fringe contrast decibel values 234 as a function of pulse delay. Although the fringe contrast decibel values 234 originate from the same results as the fringe contrast percentage 232, the decibel scale is logarithmic and the shape of the plot is graphically distinctive. Note that, similar to the fringe contrast percentage 232, the fringe contrast decibel values 234 illustrate a changing rate of decrease in the fringe contrast as a function of the pulse delay of a combined optical signal. The numerical values herein are merely presented by way of example and are not intended to limit the scope of this disclosure.

Reference is now made to FIG. 7, which is a graph 250 illustrating an embodiment of spectral interferograms plotting relative power versus wavelength of multiple optical signals. The graph 250 includes a single channel plot 260 that illustrates the relative power of an uncombined optical signal as a function of wavelength. An auto-correlation plot 262 illustrates the relative power of the single channel signal crossed with a copy of itself. Auto-correlation is frequently used to for finding repeating patterns in a signal, such as determining the presence of a periodic signal which has been buried under noise, or identifying the fundamental frequency of a signal that does not actually contain that frequency component, but implies it with many harmonic frequencies.

The graph 250 also includes a one pulse delay plot 264, which is a plot of the relative power of a signal resulting from the combination of a reference pulse and a pulse that is generated one pulse after the reference pulse. The modulation period 254 can be determined for the one pulse delay plot 264 by measuring the distance from the first valley 253 to the second valley 255. The depth of modulation can be determined by measuring the height from, for example, the second valley 255 to an adjacent peak 251.

Similarly, the graph includes a ten pulse delay plot 266 that is a plot of the relative power of a signal resulting from the combination of a reference pulse and a pulse that is generated ten pulses after the reference pulse. The modulation period 252 of the ten pulse delay plot 266 is slightly shorter than the modulation period 253 of the one pulse delay plot 264. This difference indicates a different amount of fractional overlap between the two signals that are combined. The depth of modulation 256 of the ten pulse delay plot 266 is less than the depth of modulation of the one pulse delay plot 264 because of the additional fringe contrast between the reference and reflected signals. Note that the depth of modulation decreases as the pulse delay increases. For example, the auto-correlation plot 262 has a relatively large depth of modulation whereas the depth of modulation 256 of the ten pulse delay plot 266 is notably reduced. In this manner the depth of modulation can be used to determine the number of pulses between a reflected pulse and a reference pulse. Further, by using optical pulses generated at a specific frequency, the distance between each of the pulses is known and thus the distance to a target can be determined.

It should be emphasized that the above-described embodiments of the present disclosure, particularly, any illustrated embodiments, are merely possible examples of implementations. Many variations and modifications may be made to the above-described embodiment(s) of the disclosure without departing substantially from the spirit and principles of the disclosure.

At least the following is claimed:

1. A method for providing high-precision length measurement, the method comprising:
    generating optical pulses;
    splitting the optical pulses into reference pulses and transmit pulses;
    transmitting the transmit pulses towards a target;
    receiving reflected pulses from the target;
    combining the reflected pulses and the reference pulses into a combined optical signal;
    determining a depth of modulation of the combined optical signal to determine a time of flight of the transmit pulses and the reflected pulses;
    determining a first length component from the determined time of flight;
    determining a modulation period of the combined optical signal to determine a fractional delay between a reflected pulse and a reference pulse;
    determining a second length component from the determined fractional delay; and
    summing the first and second length components to calculate the length measurement.

2. The method of claim 1, wherein determining the depth of modulation comprises determining the difference in spectral intensity between a peak and an adjacent valley in a spectral interferogram of the combined optical signal.

3. The method of claim 1, wherein determining the modulation period comprises calculating a reciprocal of a difference in optical frequency between a first peak and a second peak in a spectral interferogram of the combined optical signal.

4. A system for providing high-precision length measurement in response to received optical pulses, the system comprising:
   an optical receiver configured to receive reflected optical pulses from a target;
   an optical combiner configured to generate a combined optical signal using the reflected optical pulses and received reference optical pulses; and
   a signal analyzer configured to determine a distance to the target by:
      determining a depth of modulation of the combined optical signal to determine a first length component;
      determining a period of modulation of the combined optical signal to determine a second length component; and
      summing the first and second length components to calculate the length measurement.

5. The system of claim 4, wherein the depth of modulation is used to determine a low-resolution component of the length measurement.

6. The system of claim 4, wherein the depth of modulation comprises a difference in spectral intensity between a peak and an adjacent valley of a spectral interferogram of the combined optical signal.

7. The system of claim 4, wherein the period of modulations corresponds to a high-resolution component of the length measurement.

8. The system of claim 4, wherein the period of modulation comprises a reciprocal of a difference in optical frequency between a first peak and a second peak of a spectral interferogram of the combined optical signal.

9. The system of claim 4, wherein the first length component comprises a low-resolution component and the second length component comprises a high-resolution component.

10. A method for providing high-precision length measurement, the method comprising:
    determining a first length component of a combined optical signal by using a depth of modulation value of the combined optical signal to determine a time of flight indicative of the first length component;
    determining a second length component of the combined optical signal by using a modulation period value of the combined optical signal to determine a fractional delay between a reflected pulse and a reference pulse indicative of the second length component; and
    summing the first and second length components to calculate the length measurement.

11. The method of claim 10, wherein the first length component comprises a low-resolution value.

12. The method of claim 10, wherein the second length component comprises a high-resolution value.

13. The method of claim 10, further comprising generating a plurality of optical pulses.

14. The method of claim 13, wherein the plurality of optical pulses are generated using a mode-locked laser.

15. The method of claim 13, further comprising splitting each of the plurality of optical pulses into a plurality of reference pulses and a plurality of transmit pulses.

* * * * *